US009333497B2

(12) United States Patent
Ho et al.

(10) Patent No.: US 9,333,497 B2
(45) Date of Patent: May 10, 2016

(54) MITIGATION OF PLUGGING IN HYDROPROCESSING REACTORS

(71) Applicants: Teh C. Ho, Bridgewater, NJ (US); Krishnan Kumaran, Raritan, NJ (US); Richard C. Dougherty, Moorestown, NJ (US)

(72) Inventors: Teh C. Ho, Bridgewater, NJ (US); Krishnan Kumaran, Raritan, NJ (US); Richard C. Dougherty, Moorestown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 297 days.

(21) Appl. No.: 14/192,995

(22) Filed: Feb. 28, 2014

(65) Prior Publication Data

US 2014/0296057 A1    Oct. 2, 2014

Related U.S. Application Data

(60) Provisional application No. 61/806,613, filed on Mar. 29, 2013.

(51) Int. Cl.
| | |
|---|---|
| *B01J 38/56* | (2006.01) |
| *G05B 23/02* | (2006.01) |
| *B01J 8/02* | (2006.01) |
| *C10G 49/00* | (2006.01) |
| *C10G 75/00* | (2006.01) |
| *C10G 75/04* | (2006.01) |

(52) U.S. Cl.
CPC .. *B01J 38/56* (2013.01); *B01J 8/02* (2013.01); *C10G 49/002* (2013.01); *C10G 75/00* (2013.01); *C10G 75/04* (2013.01); *G05B 23/0254* (2013.01); *B01J 2208/0007* (2013.01); *B01J 2208/00539* (2013.01); *B01J 2208/00707* (2013.01); *B01J 2219/00211* (2013.01); *B01J 2219/00213* (2013.01); *B01J 2219/00231* (2013.01)

(58) Field of Classification Search
USPC .................................................. 700/266–274
See application file for complete search history.

(56) References Cited

U.S. PATENT DOCUMENTS

| | | | |
|---|---|---|---|
| 3,505,206 A | | 4/1970 | Decker |
| 5,071,538 A | * | 12/1991 | Clark ........................ B01J 23/90 208/112 |
| 8,380,435 B2 | | 2/2013 | Kumaran et al. |
| 2004/0078171 A1 | * | 4/2004 | Wegerich ........... G05B 23/0254 702/188 |

FOREIGN PATENT DOCUMENTS

| | | |
|---|---|---|
| WO | 2006031750 A2 | 3/2006 |
| WO | 2010056424 A1 | 5/2010 |
| WO | 2013033288 A2 | 3/2013 |

OTHER PUBLICATIONS

PCT Application No. PCT/US2014/019221, Communication from the International Searching Authority, Form PCT/ISA/220, dated Jun. 24, 2014, 9 pages.

* cited by examiner

*Primary Examiner* — Jill Warden
*Assistant Examiner* — Matthew Krcha
(74) *Attorney, Agent, or Firm* — Chad A. Guice

(57) ABSTRACT

The behavior of a monitored condition over time for a reactor or reaction system can be analyzed using groupings or windows of data to identify anomalous features in the time-average values. Anomalous features can be identified based on a threshold value generated from the analysis. Based on identification of an anomalous feature, a corrective action can be taken. For example, when the monitored condition is the pressure drop across a catalyst bed, detection of an anomaly can indicate the time to initiate a wash process for the catalyst bed before a large drop in catalyst activity occurs. By detecting an anomaly at an earlier point in time, a wash cycle can be initiated earlier so that the wash is more effective at restoring the catalyst bed to a desired condition.

15 Claims, 2 Drawing Sheets

MITIGATION OF PLUGGING IN HYDROPROCESSING REACTORS

CROSS-REFERENCE TO RELATED APPLICATIONS

This application claims priority to U.S. Provisional Application Ser. No. 61/806,613 filed Mar. 29, 2013, which is herein incorporated by reference in its entirety.

FIELD

This invention is directed to improved detection of process change events within a reaction system and steps for mitigation of such process change events.

BACKGROUND

Hydroprocessing is a commonly used technique in a refinery for improving the characteristics of a feedstock. Depending on the nature of the feed and the desired product, hydroprocessing can be used to remove contaminants such as a sulfur or nitrogen; modify the boiling range of a feed to form higher value products; modify the properties of a feed, such as cold flow properties or viscosity properties; or saturate olefins in aromatics in the feed.

One goal in selecting hydroprocessing reaction is to select reaction conditions that avoid undesirable side reactions. Unfortunately, the nature of some types of feeds makes it difficult to completely avoid such side reactions. For example, feedstocks corresponding to vacuum resid fractions are a potentially desirable feedstock for hydroprocessing. Heavy oil feed such as vacuum resids often contain substantial quantities of heteroatoms, so hydroprocessing can be valuable for removal of contaminants. Due to the relatively high boiling range of a vacuum resid feed, converting portions of the feed to lower boiling fractions can also be desirable. However, vacuum resid feeds are difficult to process in conventional fixed bed hydroprocessing reactors. This is due in part to the tendency of such feeds to cause coke formation on catalyst that is exposed to the feed. This coke formation can eventually lead to "plugging" within the catalyst bed. As used herein, plugging refers to any type of change or degradation in the flow characteristics of a catalyst bed due to coke formation. As coke formation increases the amount of coke present in the bed, the required pressure to pass a feed through the catalyst bed can increase. A sufficient amount of coking can eventually cause the catalyst bed to become unsuitable for further hydroprocessing. At this point, the hydroprocessing reactor has to be shut down to allow for replacement of the catalyst in the catalyst bed.

For reaction systems where plugging can occur due to coke formation, there is a need to mitigate the effects of plugging. Allowing a reactor to continue running until plugging occurs can allow for an increased run time in the short term, but having to shut the reactor down to exchange catalyst is usually a lengthy procedure. Methods for exchanging catalyst during operation can also be used, but such systems usually require an internal reactor structure different from a fixed bed, and thus can pose other challenges.

U.S. Pat. No. 8,380,435 describes methods for windowed statistical analysis for anomaly detection in geophysical datasets. Various statistical methods are used to identify geophysical features and characteristics based on seismic data and/or other types of data. The geophysical features can then be used to identify, for example, likely locations for hydrocarbon deposits.

SUMMARY

In various aspects, a process is provided for mitigating plugging in a reactor, such as a reactor containing a fixed bed of catalyst. The process includes monitoring one or more measured values for a reactor, such as a reactor pressure, to obtain a plurality of sampling values at a plurality of times. Optionally, the plurality of sampling values can be obtained by measuring one or more values at a second plurality of times, and then sampling the measured one or more measured values to generate the sampling values. The process further includes forming pattern window vectors having a first window size based on the sampling values, each pattern window vector being associated with a time from the plurality of times. The process further includes determining residue values for the pattern window vectors at the plurality of times based on a mean vector and a variance, the mean vector and the variance for a pattern window vector associated with a time being based on at least a portion of the pattern window vectors. Optionally, the mean vector can correspond to a moving mean vector and the variance can correspond to a moving variance. Optionally, the at least a portion of the pattern window vectors can correspond to pattern window vectors within a sampling window. The process further includes identifying a residue value greater than a threshold value, such as a threshold value based on a standard deviation of the residue values. The process further optionally includes initiating a wash sequence for the catalyst bed based on the identified residue value. Optionally, the wash sequence can be automatically initiated based on identifying the residue value that is greater than the threshold value.

BRIEF DESCRIPTION OF THE DRAWINGS

The attached Figures represent alternative embodiments of the overall invention, as well as comparative examples. The Figures pertaining to the invention are intended to be viewed as exemplary embodiments within the scope of the overall invention as claimed.

DETAILED DESCRIPTION

Overview

Figure 1:
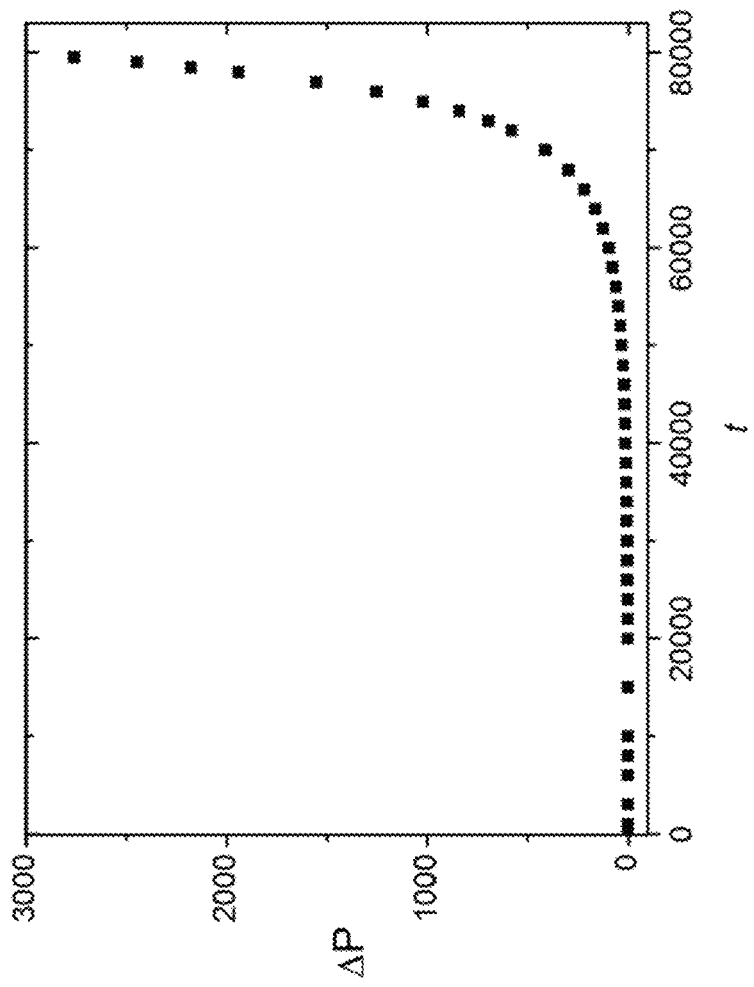
FIG. 1 shows an example of the increase in pressure drop across a catalyst bed during a hydroprocessing run.

In various aspects according to the invention, one or more reactor conditions can be monitored over time. The behavior of the monitored condition over time can be analyzed using groupings or windows of data to identify anomalous features in the time-average values. Anomalous features can be identified based on a threshold value generated from the analysis. Based on identification of an anomalous feature, a corrective action can be taken. For example, when the monitored condition is the pressure drop across a catalyst bed, detection of an anomaly can indicate the time to initiate a wash process for the catalyst bed before a large drop in catalyst activity occurs. By detecting an anomaly at an earlier point in time, a wash cycle can be initiated earlier so that the wash is more effective at restoring the catalyst bed to a desired condition.

For a monitored reaction condition, the value of the reaction condition over time is measured. For example, the pressure drop across a fixed catalyst bed within a reactor can be measured at a desired frequency, such as a once per second, once per minute, or another convenient frequency. The measured data can then be analyzed as a time series. The goal of the analysis is to identify variations in the time series data that are sufficiently unexpected relative to the prior behavior of the time series within a given time window.

Definitions

In order to clarify the description of the invention, the following definitions are provided. The following definitions should be applied throughout the description herein unless otherwise specified.

In some embodiments of the invention, reference is made to performing analysis using data vectors. Unless otherwise specified, in this discussion the term "vector" is explicitly defined to include multi-dimensional vectors, which could also be referred to as matrices. Similarly, it is noted that a matrix can potentially have only a single row or column of values. As a result, unless otherwise specified, the terms vector and matrix can be used interchangeably herein. As an example, a 1-dimensional vector can be represented as a matrix that has a single row or a single column. A 2-dimensional vector can correspond to a matrix that has both a plurality of rows and a plurality of columns.

In some embodiments of the invention, reference is made to conversion of a feedstock relative to a conversion temperature T. Conversion relative to a temperature T is defined based on the portion of the feedstock that boils at a temperature greater than the conversion temperature T. The amount of conversion during a process (or optionally across multiple processes) is defined as the weight percentage of the feedstock that is converted from boiling at a temperature above the conversion temperature T to boiling at a temperature below the conversion temperature T. For example, consider a feedstock that includes 40 wt % of components that boils at 1050° F. (566° C.) or greater. By definition, the remaining 60 wt % of the feedstock boils at less than 1050° F. (566° C.). For such a feedstock, the amount of conversion relative to a conversion temperature of 1050° F. (566° C.) would be based only on the 40 wt % that initially boils at 1050° F. (566° C.) or greater. If such a feedstock is exposed to a process with 30% conversion relative to a 1050° F. (566° C.) conversion temperature, the resulting product would include 72 wt % of components boiling below 1050° F. (566° C.) and 28 wt % of components boiling above 1050° F. (566° C.).

In various aspects of the invention, one way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. Such a boiling point can be referred to as a fractional weight boiling point. A fractional weight boiling point, corresponding to the percentage of a feed that will boil at a given temperature, can be determined, for example, by the method specified in ASTM D2887. Generally, this can include determining a fractional weight boiling point via gas chromatographic distillation (GCD).

In this discussion, reference is made to conditions that can be measured for a reactor. Such conditions can be referred to as reactor conditions, such as a reactor pressure, a reactor temperature, or another condition associated with a reactor. It is understood that reactor conditions, unless otherwise specified, can correspond to conditions associated with a reaction system that includes one or more reactors. Thus, a reactor pressure can correspond to a pressure at a location in a reaction system that is external to a reactor, such as a pressure at a location between two reactors in a reaction system. A reactor condition that is directly associated with a reactor, such as a condition internal to the reactor or a condition associated with an inlet or an outlet of the reactor, can be specified as a reactor condition associated with the reactor.

Data Monitoring and Accumulation for Reaction Systems

In various aspects of the invention, one or more values for a reaction system can be measured on a periodic basis. For a hydroprocessing reactor, values that can routinely be measured include flow rates for liquid or gas flows into the reactor; the pressure in the reactor a given reactor height; a pressure differential between two locations in the reactor (such as the pressure differential across a catalyst bed or other reactor feature; still other types of reactor pressures; a temperature at a reactor inlet or a reactor outlet; or any other desired measurable value.

The rate for measuring a value can be any convenient rate. In some aspects, the sampling rate can be selected based on an expected relevant time scale for the measured value. Thus, the sampling rate can be on the order of milliseconds, seconds, minutes, or hours, depending on the nature of the monitored process. It is noted that the measurement rate for measuring a reaction condition does not have to be the same as the sampling rate for use in data analysis. For example, the pressure drop across a fixed catalyst bed can be measured once a second, but the data analysis may use only one out of every two measured values. More generally, any convenient relationship between the measurement rate and the sampling rate can be used. Additionally, if the sampling rate is lower than the measurement rate, averaging or blending of the measured values to generate average sample values can also be performed.

It is noted that for each measurement and/or sampling value, a plurality of values can actually be collected. In this type of embodiment, at each sampling point, more than one measurement value is available. For example, a first pressure drop can be measured across a first catalyst bed, a second pressure drop can be monitored across a second catalyst bed, and a temperature at the reactor outlet could be monitored. This would result in each sampling point corresponding to a vector containing three values.

Anomaly Detection to Identify Initiation of Reactor Plugging Event

In various aspects of the invention, either before or after selecting the measurement rate and/or sampling rate, time windows for performing analysis on the data can also be selected. One type of time window can be a "pattern window". The pattern window describes the number of data points that will are considered together as a grouping. For example, if the pattern window has a size of 10 data points, when the measurement data is analyzed, the data can be used as groups of 10 data points. Preferably, the pattern windows for a data set can overlap. For example, for a pattern window of 8 data points, a first window can contain measurements 1-8, while the next window can correspond to measurements 2-9. By using the data set within a pattern window as the smallest chunk of data that is analyzed, the analysis can capture more than just the instantaneous states of a reaction system. Instead of focusing just on individual data points, use of pattern windows allows short term behavior (such as process dynamics) of a system to also be captured.

The size of the pattern window can be any convenient size. The size for the pattern window can be selected based on several factors. A larger pattern window size is beneficial for detecting anomalous patterns that are expressed over a larger number of data points. However, use of a larger pattern window can reduce the speed with which a shorter anomaly is identified. Suitable pattern window sizes can be at least about 5 sampling points, such as at least about 8 sampling points or at least about 10 sampling points. Additionally or alternatively, the pattern window size can be as large as desired. From a practical standpoint, the pattern window size can be about 50 sampling points or less, such as about 25 sampling points or less, or about 20 sampling points or less.

Another type of time window is the sampling or memory window. The sampling or memory window should be substantially larger than the pattern window. The sampling window corresponds to the number of measurements that are considered in determining whether a subset of the measurements (such as the pattern window) corresponds to unusual or anomalous data. The sampling window can correspond to an explicit number of pattern windows that are considered when calculating properties for a time series of data. Alternatively, the sampling window can be approximated by using a weighting factor for blending a new pattern window vector into the existing analysis. By using a weighting factor, older pattern vectors become progressively less important in the accumulated data, which has an effect similar to having a fixed size for the sampling window.

In some preferred aspects of the invention, the size of the sampling window can be substantially larger than the size of the pattern window, such as having a sampling window that is at least about 5 times the size of the pattern window, or at least about 10 times the size of the pattern window, or at least about 20 times the size of the pattern window. One of the goals of the pattern window analysis can be to identify anomalous patterns in a data set. If the sampling window is not sufficiently large relative to the pattern window, the sampling window may not incorporate enough of the pattern history for a system. This can lead to, for example, false positives in identification of anomalous patterns when a common but infrequent pattern may be identified as anomalous. If a memory parameter $\mu$ is used instead of an explicit sampling window, the value of $\mu$ can be selected so that $1/\mu$ is substantially larger than the size of the pattern window. Depending on the aspect, a suitable value for $\mu$ can be about 0.1 or less, such as about 0.05 or less, or about 0.01 or less, or even about 0.001 or less.

In some aspects of the invention, data analysis can be performed using a plurality of sampling windows and/or pattern windows based on the same data. As described in more detail below, changing the size of the sampling window and/or pattern window can impact the types of anomalies that are detected. Additionally, changing the size of the sampling window and/or pattern window can impact how quickly an anomaly is detected.

After selecting a pattern window size and a sampling window size (or alternatively a sampling weighting factor), the analysis technique can be applied to the data. The analysis includes several steps which are repeated for each new measurement included in the analysis.

At the beginning of the analysis, an initial vector of values is formed for each measurement or data point. In the example below, a single pressure value will be discussed, so the vector for each data point in the example will have a length of one. However, it is understood that the discussion below can equally apply to data point vectors of an arbitrary length.

The data point vectors for each data point can then be used to form pattern window vectors. The pattern window vectors have a width corresponding to the size of the data point vectors and a length corresponding to the pattern window size. In an example where the data point vectors correspond to just a single pressure value, and where the pattern window is of size 10, the pattern window vector has a width of 1 and a length of 10. Such a pattern window vector corresponds to a one-dimensional vector, or a matrix having a single row or column. If the data point vectors contain more than one measurable value, the resulting pattern window vectors can correspond to two-dimensional vectors or matrices.

For each new data point vector (i.e., each new measurement(s) point), a new pattern window vector is created. In the example of a single measured value and a pattern window of 10, a new vector is created by using values 1-9 from the prior pattern window vector as values 2-10 for the new vector. Element 1 of the new vector corresponds to the new measured value. Element 10 from the prior vector is not directly used in forming the new vector. As additional data point vectors are obtained, additional pattern window vectors are formed. It is noted that for the first few data points, a sufficient number of data point vectors will not be available to form a pattern window vector. In order to initiate the process, a default set of data point vectors can be provided.

Equation (1) shows an example of using data point vectors x to form a plurality of pattern window vectors y. The plurality of pattern window vectors y shown in Equation (1) represent the number of pattern window vectors that are contained within a sampling window of window size $W_m$.

$$\{\underline{y}(W_p), \ldots \underline{y}(W_m + W_p - 1)\} \equiv \left\{ \begin{bmatrix} x(1) \\ x(2) \\ \vdots \\ x(W_p) \end{bmatrix}, \begin{bmatrix} x(2) \\ x(3) \\ \vdots \\ x(W_p + 1) \end{bmatrix}, \ldots, \begin{bmatrix} x(W_m) \\ x(W_m + 1) \\ \vdots \\ x(W_m + W_p - 1) \end{bmatrix} \right\} \quad (1)$$

In Equation (1), x(t) corresponds to the measurement value or values at time t. In equation (1), x(t) is shown as a single value, but it could also represent a plurality of measured values at the time t. $W_p$ corresponds to the size of the pattern window. $W_m$ corresponds to the sample window size. y[x(t)] corresponds to the pattern window vector for each time t.

Formation of the pattern window vectors can allow for analysis of the data point vectors based on groups of the data point vectors, as opposed to analyzing individual data points. Using Equation (1), values such as the mean, second moment, and variance could be directly calculated at each time "t" based on the preceding pattern vectors within the sampling window. Alternatively, rather than explicitly performing a calculation on the collection of pattern vectors in a sampling window at each time t, the sampling window can be approximated using a weighting factor $\mu$. This results in calculation of a moving mean, moving second moment, and moving variance. Equations (2)-(5) correspond to the transformations that enable determination of a moving mean, moving second moment, and moving variance based on pattern window vectors in order to identify unusual or anomalous behavior.

$$m(t)=\mu y(t)+(1-\mu)m(t-1); m(1)=y(1) \quad (2)$$

$$\Lambda(t)=\mu y(t)[y(t)]^T+(1-\mu)\Lambda(t-1); \Lambda(1)=y(1)[y(1)]^T \quad (3)$$

$$\Sigma(t)=\Lambda(t)-m(t)[m(t)]^T \quad (4)$$

$$R(t)=[y(t)-m(t-1)]^T[\Sigma(t-1)]^{-1}[y(t)-m(t-1)] \quad (5)$$

Equation (2) in is an equation for calculating a mean vector m at a given time (t). The mean vector m provides an estimate of the mean for a time series of values. As shown in Equation (2), the mean vector m(t) is determined by blending the pattern vector y(t) with the mean vector for the prior time instance m(t−1). The blending of the pattern vector y(t) with the prior mean vector m(t−1) is performed by using a weighting factor, μ, to blend the two vectors. The weighting factor μ can be referred to as the "memory parameter" or "memory value". As shown in Equation (2), increasing the value of memory parameter μ will increase the weight of the current pattern vector y(t) in the new mean vector m(t). The value of memory parameter μ provides a mathematical way to implicitly select the size of the memory window $W_m$ for the analysis without having to explicitly use all of the pattern window vectors within a window in the calculation of the mean vector. As the value of memory parameter μ decreases, the effective size of the memory window $W_m$ increases.

Equation (3) provides a method for determining a second moment Λ(t) at a given point in the time series of data. As shown in Equation (3), the second moment Λ(t) is also determined using the memory parameter μ to blend the eigenvalue (or sum of eigenvalues) for the current pattern vector y(t) with the second moment for the prior time Λ(t−1). It is noted that $[y(t)]^T$ refers to the transpose of the pattern vector. Equation (4) then provides a method for calculating the variance Σ(t) based on the second moment Λ(t) and the eigenvalue (or sum of eigenvalues) for m(t).

As measurement values or sampling values are accumulated for various time points "t", Equation (1) allows for generation of corresponding pattern window vectors y(t), while Equations (2), (3), and (4) allow for calculation of the mean m(t), second moment Λ(t), and variance Σ(t). Calculation of the mean and variance values then allows for determination of an additional "residue value" R(t), which is defined in Equation (5). As shown in Equation (5), the residue value R(t) corresponds to a difference between the current pattern vector y(t) and the mean vector for the previous pattern vectors m(t−1). In other words, the residue value R(t) provides a rough mathematical estimation of the amount of difference between a current pattern vector y(t) and the previous pattern vectors that have been blended together to form the mean vector.

The residue value R(t) can be used to identify potentially anomalies or outliers within the pattern vectors y. Instead of attempting to identify an individual time point t where an individual set of measured data points is anomalous, calculation of the residue value R(t) allows for determination of when a time series of measurement data points is anomalous relative to the prior patterns of the measured data points. An anomalous pattern vector at a time "t" can be identified based on determination of a conventional standard deviation (σ) for the series of residue values R(t) leading up to time "t". A threshold can then be set based on the calculated standard deviation for the residue values, such as having a threshold of 1σ, 2σ, or any other convenient value based on the standard deviation.

It is noted that for Equations (2)-(5), by using a memory parameter μ, the pattern window vectors within a memory window $W_m$ do not need to be explicitly retained and used in a calculation. Instead, only the current pattern window vector (at time t) and the vectors or values for the immediately preceding time "t−1" need to be retained in order to calculate the new analysis vectors or values at time "t". This simplifies the calculation as well as improving the speed of the calculation. If desired, the calculation of the mean vector, second moment, and variance in Equations (2)-(4) can be explicitly performed on all pattern vectors within a sampling window.
Application of Residue Calculation—Reactor Plugging Based on Equations (1)-(5), anomalies in time series of measurements can be identified based on patterns in the time series, as opposed to being based analysis of individual measured values. This can be useful, for example, in situations where an anomaly corresponds to a change in the sequence of measured values generated by a system, as opposed to an anomaly where the absolute magnitude of a measured value is unusual.

One application for using a residue calculation can be to identify the early stages of catalyst bed plugging in a hydroprocessing reactor or another reactor that employs a fixed bed of catalyst. Without being bound by any particular theory, it is believed that a common cause of reactor plugging in fixed-bed hydroconversion units is the formation of coke on the catalysts and/or in the void spaces between catalyst particles. This coke formation can be non-uniform across a catalyst bed, and in many cases a reactor may have to be shut down even though part of the catalyst bed remains active.

It is believed that a major driving force for coke formation is related to the formation of a carbonaceous mesophase. This carbonaceous mesophase can arise due to incompatibility (or low compatibility) of some components within a feedstock, such as a heavy oil feedstock. For example, for a resid feedstock, asphaltenes can correspond to some of the most thermally reactive species within the feed. The thermolysis of asphaltenes can lead to the formation of thermal coke as a result of liquid-liquid phase separation. By contrast, catalytic coke forms via dehydrogenation, condensation, and cross-linking mechanisms.

Equation (6) below schematically shows a proposed series of stages for the initial formation of a carbonaceous mesophase and subsequent coalescence/adhesion during carbonization to form progressively harder (and more difficult to remove) forms of coke. Without being bound by any particular theory, it is believed that the process schematically shown by Equation (6) plays a role in causing reactor fouling and plugging. In this process, the freshly formed coke, called protocoke, is easy to remove. This protocoke then becomes converted to soft coke, which in turn is progressively converted to hard coke. This hard coke is much tougher to remove. Over time the fraction of soft coke declines substantially, while that of hard coke increases.

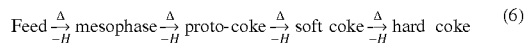

$$\text{Feed} \xrightarrow[-H]{\Delta} \text{mesophase} \xrightarrow[-H]{\Delta} \text{proto-coke} \xrightarrow[-H]{\Delta} \text{soft coke} \xrightarrow[-H]{\Delta} \text{hard coke} \quad (6)$$

It is believed that the carbonaceous mesophase and/or proto-coke phase in coke formation represents material that can be at least partially removed in-situ without requiring a shutdown of a reactor. For example, a suitable wash procedure can be used to at least partially solubilize and/or otherwise remove the carbonaceous mesophase and/or proto-coke that has formed within a catalyst bed. By contrast, after formation of soft coke and/or hard coke phase in a catalyst bed in a fixed-bed reactor, the coke phase can be difficult to remove without shutting down the reactor and changing the catalyst in the catalyst bed. Thus, if the initiation or initial formation of the carbonaceous mesophase can be detected, a wash procedure can be used prior to formation of the more difficult to remove carbonaceous materials (such as hard coke).

Unfortunately, by the time coke formation within a catalyst bed becomes sufficient to cause a substantial pressure drop across the bed, the coke formation process has already progressed from initiation or carbonaceous mesophase to formation of a difficult to remove form of coke. FIG. 1 shows an example of the pressure drop across a hydroprocessing catalyst bed during hydroprocessing of a heavy oil feedstock. The pressure drop versus time behavior is highly nonlinear. In an initial portion of the plot, the pressure drop across the catalyst bed exhibits relatively flat behavior. However, at some point the behavior of the pressure drop curve changes and exponential growth in the pressure drop occurs. By the time the exponential growth has started, the formation of coke is sufficiently far along that washing of the catalyst bed provides only a modest or temporary benefit. Thus, simple magnitude analysis of the pressure drop across the bed and/or analysis of the slope of the pressure drop curve is not sufficient to allow detection of when the carbonaceous mesophase is forming but the harder to remove coke is present at only reduced or minimal levels.

Instead of attempting to detect the early stages of coke formation by direct analysis of individual pressure measurements, analysis of pattern windows in time history data for pressure can be used. As described above, pattern windows can be formed based on the pressure data over time, and a residue value R(t) can be calculated at each measurement (or sampling) point. Based on the variance in the calculated residue values, unusual patterns or anomalies can be detected in the patterns of the pressure data. Upon detection of an anomaly, a wash action can be performed in an effort to remove or otherwise mitigate the coke formation in the catalyst bed.

Figure 2:
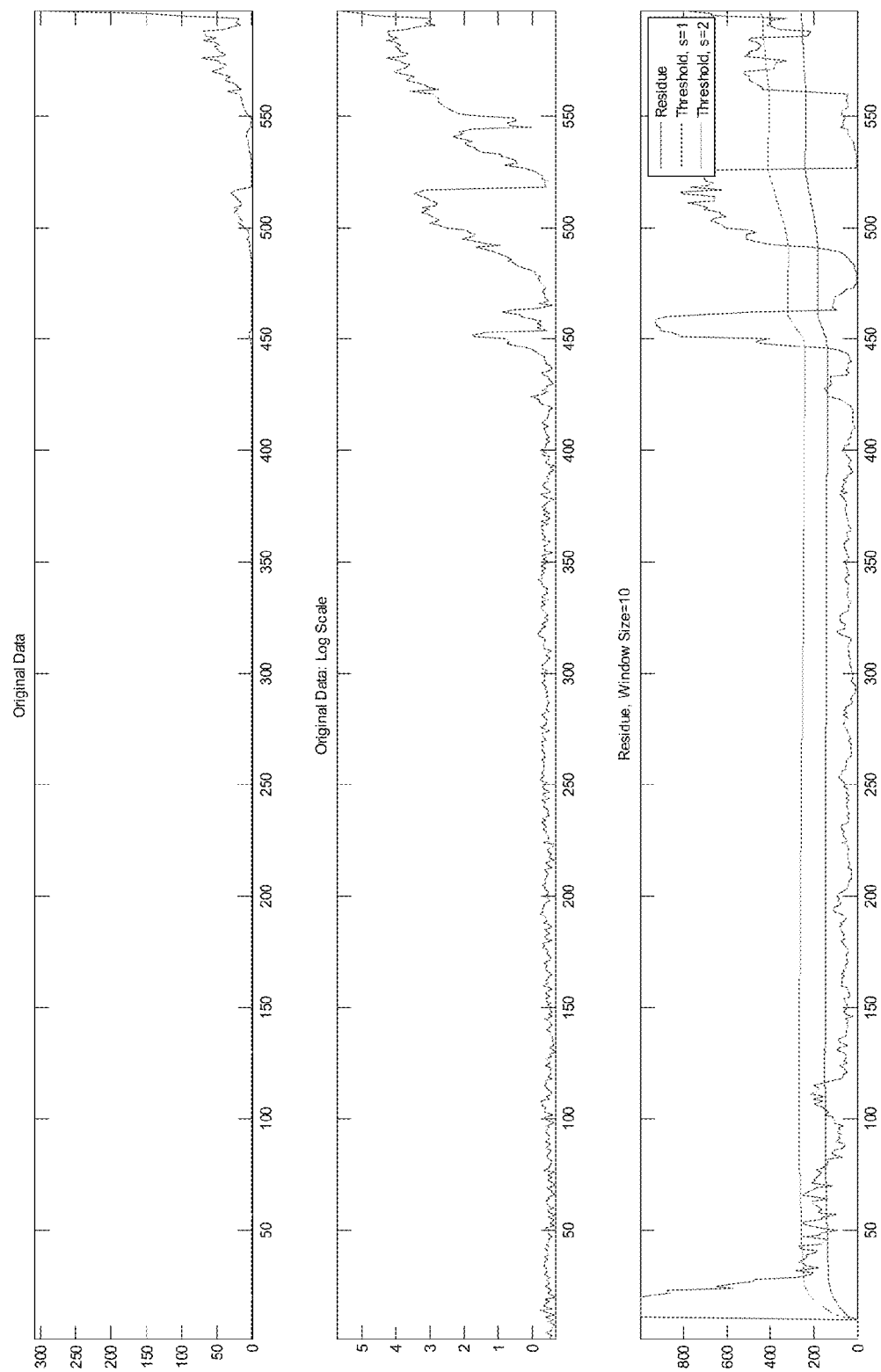
FIG. 2 shows various plots of pressure drop behavior across a catalyst bed during a hydroprocessing run, including calculated residue values and threshold values according to an embodiment of the invention.

FIG. 2 shows an example of applying Equations (2)-(5) to data corresponding to the pressure drop across a catalyst bed over time. In FIG. 2, the top plot shows a monitored reactor pressure in the form of a monitored pressure drop across the catalyst bed. As shown in the top plot, no meaningful pressure drop appears to occur until about 500 hours into the process. Although the scale of the axis is shown in hours, the sampling rate for the data is actually on the order of minutes. The middle plot in FIG. 2 shows the same data, but plotted on a logarithmic scale on the y-axis. In the middle plot, the changes in pressure over time are more apparent. However, the log plot itself provides little guidance regarding which peaks should be considered significant and therefore should be identified as an event for taking action, such as initiating a wash sequence.

The bottom plot in FIG. 2 was generated by applying Equations (2)-(5) to the same data as in the top plot. For the bottom plot, a pattern window size of 10 was selected. The value of the memory parameter, $\mu$, was set to 0.01. The residue value R(t) was then calculated for the data, along with a variance $\sigma$ for the residue. The bottom plot shows the value of the residue R as a function of time, along with lines corresponding to $1\sigma$ and $2\sigma$ values for the residue. The $1\sigma$ and $2\sigma$ values are plotted relative to the mean value of the residue R at a given time.

In the bottom plot in FIG. 2, the early portion of the plot (prior to about 100 hours) represents a learning period for the residue function. As types of patterns exhibited by the pressure drop measurements are incorporated into the mean vector in Equation (2), the resulting residue value R(t) from Equation (5) becomes lower in value. After this learning period, the value of the residue value R(t) drops below the $1\sigma$ value for the residue and remains there. At this point, the residue value R(t) can be used for detection of anomalous patterns in the data.

In the bottom plot in FIG. 2, both a $1\sigma$ threshold and a $2\sigma$ threshold are shown. Using a $1\sigma$ threshold allows for the earliest detection of an anomalous pattern, as shown by the crossing of the $1\sigma$ threshold by the peak at about 425 hours. Using a $2\sigma$ threshold can decrease the number of events counted as anomalies, if a lower sensitivity to unusual patterns is desired. More generally, any convenient multiple (or other mathematic manipulation) of the standard deviation $\sigma$ in the residue can be used to establish a threshold value for anomaly detection.

It is noted that the value of the residue value R(t) is not dependent on the absolute magnitude of the values in the raw data, such as the measured pressure drop values. For example, the top and middle plots show a series of increasingly tall peaks. By contrast, the largest peak in the residue corresponds to the peak at about 450 hours, with subsequent peaks being smaller in value. Additionally, the peak present in the middle plot (log scale) at 550 hours is missing in the bottom plot (residue), while the first peak that crosses the $1\sigma$ threshold in the bottom plot is not clearly identifiable as a peak even in the middle plot with the logarithmic scale. Thus, the residue plot can provide a qualitatively different type of information than a direct plot of the magnitude of a measured value.

In FIG. 2, only one residue plot is shown based on the pressure drop data. Another potential advantage of calculation residue values is that multiple residue value plots can be generated by modifying the pattern window size and the memory factor $\mu$. For example, two residue plots could be used to identify two types of patterns within a data set. A first residue plot could be tuned to have a smaller pattern window, such as a pattern window of 5, and a higher value of $\mu$, such as $\mu$=0.05 or 0.1. This combination of pattern window size of memory factor $\mu$ would be suitable for more rapid identification of shorter time scale patterns. The residue value for this parameter selection may be more noisy, so a $2\sigma$ threshold could be appropriate for identifying anomalous patterns. The same initial measurement data could also be used for calculation of a second set of residue values with a larger pattern window, such as a window size of 20, and a lower value of $\mu$, such as $\mu$=0.01 or $\mu$=0.005. This second type of residue calculation will require a longer induction time. Additionally, due to the size of the pattern window, this second residue calculation will tend to take longer to identify an anomalous pattern. However, this second type of calculation will also be suitable for detecting patterns that require a longer window to observe. In general, using a larger pattern window size can reduce the amount of natural variation in the residue, so a smaller $1\sigma$ or $1.5\sigma$ threshold can be suitable for identifying an anomalous pattern. More generally, any convenient number of residues can be calculated based on a set of measurement values, in order to provide residues with different sensitivity to different types of pattern anomalies.

Mitigation of Plugging Event—Wash Procedures

Once an anomaly is detected based on a residue exceeding a threshold value, a corrective action can be taken to mitigate the potential coke formation that is occurring within the catalyst bed. One option can be to stop processing of the current feed being processed in the reactor, so that the input feed to the reactor can be modified to include a wash solvent feed. Modifying the input feed can then allow a wash sequence or wash cycle to be performed. The original feed can then be resumed after the solvent wash cycle is completed.

Examples of suitable wash solvent feeds for a fixed catalyst bed of hydroprocessing catalyst can include, but are not limited to, trimethyl benzene, N-methylpyrrolidone, light cycle oils, other refinery streams containing one- or two-ring aromatics, or combinations thereof. The solvent flow rate and wash time can be set to treat the catalyst bed with at least three reactor volumes of the wash solvent, such as at least five reactor volumes or at least ten reactor volumes. The amount of wash solvent used in a wash sequence can correspond to the entire feed during the wash sequence, or a wash sequence can be performed using a portion of the feed being processed and a portion of wash solvent. For example, a solvent wash can be performed by blending the feed with a portion of the wash solvent, so that at least about 30 vol % of the total feed corresponds to the wash solvent, preferably at least about 50 vol % such as at least about 70%.

When an anomaly is detected, the wash cycle can be automatically triggered and performed without operator intervention. Alternatively, the anomaly can trigger a warning of some type for an operator, and the operator can initiate a selected type of wash cycle. Any suitable type of warning can be provided, such as providing an audible alarm, displaying a message on a monitor or other type of video display, sending a message or e-mail to a device, or another type of warning. An operator for the reactor can then initiate a desired wash sequence.

Although the analysis for anomaly detection has been described with regard to mitigation of plugging in hydroprocessing reactors, it is understood that measured values associated with various refinery processes can be analyzed by grouping the measured values into pattern windows and determining one or more residue values.

Feedstock for Hydroprocessing

In various aspects, detection of anomalous patterns for identification of coke formation can be used in conjunction with hydroprocessing of a heavy oil or heavy oil feed component. Examples of heavy oils include, but are not limited to, heavy crude oils, distillation residues, heavy oils coming from catalytic treatment (such as heavy cycle oils from fluid catalytic cracking), thermal tars (such as oils from visbreaking or similar thermal processes), oils (such as bitumen) from oil sands, shale oils, and coal liquids.

Heavy oils can be liquid, semi-solid, and/or solid. Additional examples of particular heavy oils that can be hydroprocessed (such as hydrocracked), treated and/or upgraded according to this invention include Athabasca bitumen, vacuum resid from Brazilian Santos and Campos basins, Egyptian Gulf of Suez, Chad, Venezuelan Zulia, Malaysia, and Indonesia Sumatra. Other examples of heavy oil include residuum from refinery distillation processes, including atmospheric and vacuum distillation processes. Such heavy oils can have an initial ASTM D86 boiling point of 650° F. (343° C.) or greater. Preferably, the heavy oils will have an ASTM D86 10% distillation point of at least 650° F. (343° C.), alternatively at least 660° F. (349° C.) or at least 750° F. (399° C.). In some aspects the D86 10% distillation point can be still greater, such as at least 950° F. (510° C.), or at least 1020° F. (549° C.), or at least 1050° F. (566° C.).

In addition to initial boiling points and/or 10% distillation points, other distillation points may also be useful in characterizing a feedstock. For example, a feedstock can be characterized based on the portion of the feedstock that boils above 1050° F. (566° C.). In some aspects, a feedstock can have an ASTM D86 70% distillation point of 1050° F. (566° C.) or greater, or a 60% distillation point of 1050° F. (566° C.) or greater, or a 50% distillation point of 1050° F. (566° C.) or greater, or a 40% distillation point of 1050° F. or greater.

Still another way of characterizing a feedstock is by characterizing the flow rate of a portion of the feed relative to the amount of catalyst being used for processing the feed. For example, the portion of a feedstock that boils at about 1050° F. (566° C.) or above is often a more difficult portion of a feedstock to process. As a result, the practical flow rate for a feedstock is influenced by the amount of the feedstock that boils above 1050° F. relative to the amount of hydroprocessing catalyst. In some aspects, the liquid hourly space velocity of the 1050° F.+(566° C.+) portion of a combined feedstock (including both fresh feed and solvent) relative to hydroprocessing catalyst can be at least about 0.05 hr$^{-1}$, such as at least about 0.10 hr$^{-1}$, or at least about 0.12 hr$^{-1}$, or at least about 0.15 hr$^{-1}$, or at least about 0.20 hr$^{-1}$.

Heavy oils can be relatively high in total acid number (TAN). TAN can be expressed in terms of mg of KOH per g of heavy oil. For example, some heavy hydrocarbon oils that can be optionally hydroprocessed according to this invention have a TAN of at least 0.1, at least 0.3, or at least 1.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity is at most 20° in one aspect, at most 15° in another aspect, and at most 10° in another aspect.

Heavy oils can be high in metals. For example, the heavy oil can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron.

Contaminants such as nitrogen and sulfur are typically found in heavy oils, often in organically-bound form. Nitrogen content can range from about 50 wppm to about 5000 wppm elemental nitrogen, or about 75 wppm to about 800 wppm elemental nitrogen, or about 100 wppm to about 700 wppm, based on total weight of the heavy hydrocarbon component. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oils containing at least 500 wppm elemental sulfur, based on total weight of the heavy oil. Generally, the sulfur content of such heavy oils can range from about 500 wppm to about 100,000 wppm elemental sulfur, or from about 1000 wppm to about 50,000 wppm, or from about 1000 wppm to about 30,000 wppm, based on total weight of the heavy component. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, di- and polysulfides.

Heavy oils can be high in n-pentane asphaltenes. In some aspects, the heavy oil can contain at least about 5 wt % of n-pentane asphaltenes, such as at least about 10 wt % or at least 15 wt % n-pentane asphaltenes.

Processing Conditions

Hydroprocessing (alternatively hydroconversion) generally refers to treating or upgrading the heavy hydrocarbon oil component that contacts the hydroprocessing catalyst. Hydroprocessing particularly refers to any process that is carried out in the presence of hydrogen, including, but not limited to, hydroconversion, hydrocracking (which includes selective hydrocracking), hydrogenation, hydrotreating, hydrodesulfurization, hydrodenitrogenation, hydrodemetallation, hydrodearomatization, hydroisomerization, and hydrodewaxing including selective hydrocracking. The hydroprocessing reaction is carried out in a vessel or a hydroprocessing zone in which heavy hydrocarbon and solvent contact the hydroprocessing catalyst in the presence of hydrogen.

Contacting conditions in the contacting or hydroprocessing zone can include, but are not limited to, temperature, pressure, hydrogen flow, hydrocarbon feed flow, or combinations thereof. Contacting conditions in some embodiments are controlled to yield a product with specific properties.

Hydroprocessing is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more preferably at least about 75 vol. % hydrogen.

Hydrogen can be supplied at a rate of from 1000 SCF/B (standard cubic feet of hydrogen per barrel of total feed) (178 S $m^3/m^3$) to 10000 SCF/B (1780 S $m^3/m^3$). Preferably, the hydrogen is provided in a range of from 2000 SCF/B (356 S $m^3/m^3$) to 5000 SCF/B (891 S $m^3/m^3$).

Hydrogen can be supplied co-currently with the heavy hydrocarbon oil and/or solvent or separately via a separate gas conduit to the hydroprocessing zone. The contact of the heavy hydrocarbon oil and solvent with the hydroprocessing catalyst and the hydrogen produces a total product that includes a hydroprocessed oil product, and, in some embodiments, gas.

The temperature in the contacting zone can be at least about 680° F. (360° C.), such as at least about 700° F. (371° C.), and preferably at least about 716° F. (380° C.), such as at least about 750° F. (399° C.) or at least about 788° F. (420° C.). Additionally or alternately, the temperature in the contacting zone can be about 950° F. (510° C.) or less, such as about 900° F. (482° C.) or less, and preferably about 869° F. (465° C.) or less or about 842° F. (450° C.) or less.

Total pressure in the contacting zone can range from 200 psig (1379 kPa-g) to 3000 psig (20684 kPa-g), such as from 400 psig (2758 kPa-g) to 2000 psig (13790 kPa-g), or from 650 psig (4482 kPa-g) to 1500 psig (10342 kPa-g), or from 650 psig (4482 kPa-g) to 1200 psig (8273 kPa-g). Preferably, a heavy oil can be hydroprocessed under low hydrogen partial pressure conditions. In such aspects, the hydrogen partial pressure during hydroprocessing can be from about 200 psia (1379 kPa) to about 1000 psia (6895 kPa), such as from 500 psia (3447 kPa) to about 800 psia (5516 kPa). Additionally or alternately, the hydrogen partial pressure can be at least about 200 psia (1379 kPa), or at least about 400 psia (2758 kPa), or at least about 600 psia (4137 kPa). Additionally or alternately, the hydrogen partial pressure can be about 1000 psia (6895 kPa) or less, such as about 900 psia (6205 kPa) or less, or about 850 psia (5861 kPa) or less, or about 800 psia (5516 kPa) or less, or about 750 psia (5171 kPa) or less. In such aspects with low hydrogen partial pressure, the total pressure in the reactor can be about 1200 psig (8274 kPa-g) or less, and preferably 1000 psig (6895 kPa-g) or less, such as about 900 psig (6205 kPa-g) or less or about 800 psig (5516 kPa-g) or less.

Liquid hourly space velocity (LHSV) of the combined heavy hydrocarbon oil and recycle components will generally range from 0.1 to 30 $h^{-1}$, or 0.4 $h^{-1}$ to 20 $h^{-1}$, or 0.5 to 10 $h^{-1}$. In some aspects, LHSV is at least 15 $h^{-1}$, or at least 10 $h^{-1}$, or at least 5 $h^{-1}$. Alternatively, in some aspects LHSV is about 2.0 $h^{-1}$ or less, or about 1.5 $h^{-1}$ or less, or about 1.0 $h^{-1}$ or less.

Based on the reaction conditions described above, in various aspects of the invention, a portion of the reactions taking place in the hydroprocessing reaction environment can correspond to thermal cracking reactions. In addition to the reactions expected during hydroprocessing of a feed in the presence of hydrogen and a hydroprocessing catalyst, thermal cracking reactions can also occur at temperatures of 360° C. and greater. In the hydroprocessing reaction environment, the presence of hydrogen and catalyst can reduce the likelihood of coke formation based on radicals formed during thermal cracking.

In an embodiment of the invention, contacting the input feed to the hydroconversion reactor with the hydroprocessing catalyst in the presence of hydrogen to produce a hydroprocessed product is carried out in a single contacting zone. In another aspect, contacting is carried out in two or more contacting zones.

In various embodiments of the invention, the combination of processing conditions can be selected to achieve a desired level of conversion of a feedstock. For various types of heavy oil feedstocks, conversion relative to a conversion temperature of 1050° F. (566° C.) is a convenient way to characterize the amount of feedstock conversion. For example, the process conditions can be selected to achieve at least about 25% conversion of the 1050° F.+ portion of a feedstock. In other words, the conditions are selected so that at least about 25 wt % of the portion of the feed that boils above 1050° F. (566° C.) is converted to a portion that boils below 1050° F. (566° C.). In some aspects, the amount of conversion relative to 1050° F. (566° C.) can be at least about 40%, such as at least about 50% or at least about 60%. Additionally or alternately the conversion percentage can be about 80% or less, such as about 75% or less or about 70% or less. An example of a suitable amount of conversion can be a conversion percentage from about 40% to about 80%, such as about 50% to about 70%.

The catalysts used for hydroconversion of a heavy oil feed can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. It is within the scope of the invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst. It is noted that under hydroprocessing conditions, the metals may be present as metal sulfides and/or may be converted metal sulfides prior to performing hydroprocessing on an intended feed.

ADDITIONAL EMBODIMENTS

Embodiment 1

A process for mitigating plugging in a reactor containing a fixed bed of catalyst, comprising: monitoring a reactor pressure to obtain a plurality of sampling values at a plurality of times; forming pattern window vectors having a first window size based on the sampling values, each pattern window vector being associated with a time from the plurality of times; determining residue values for the pattern window vectors at the plurality of times based on a mean vector and a variance, the mean vector and the variance for a pattern window vector associated with a time being based on at least a portion of the pattern window vectors; identifying a residue value greater than a threshold value; and initiating a wash sequence for the catalyst bed based on the identified residue value.

Embodiment 2

A process for mitigating plugging in a reactor containing a fixed bed of catalyst, comprising: monitoring a reactor pressure to obtain a plurality of sampling values at a plurality of times; forming pattern window vectors having a first window size based on the sampling values; selecting a memory value $\mu$, where $1/\mu$ is greater than the first window size; determining residue values for the pattern window vectors at the plurality of times based on the selected memory value, a moving mean vector, and a moving variance, the moving mean vector and the moving variance for a pattern vector associated with a time being based on at least a portion of the pattern window vectors; identifying a residue value greater than a threshold value; and initiating a wash sequence for the catalyst bed based on the identified residue value.

Embodiment 3

A process for identifying anomalous events in a reactor, comprising: monitoring a measurable value associated with a reaction system containing a reactor, preferably a measurable associated with a reactor, to obtain a plurality of sampling values at a plurality of times; forming pattern window vectors having a first window size based on the sampling values; determining residue values for the pattern window vectors at the plurality of times based on a mean vector and a variance, the mean vector and the variance for a pattern window vector associated with a time being based on at least a portion of the pattern window vectors; identifying a residue value greater than a threshold value; and initiating a corrective action for the reactor based on the identified residue value.

Embodiment 4

The process of any of the above embodiments, wherein monitoring a reactor pressure comprises monitoring a pressure drop across a catalyst bed.

Embodiment 5

The process of any of the above embodiments, further comprising monitoring one or more additional pressures or temperatures.

Embodiment 6

The process of Embodiment 5, wherein the pattern window vectors comprise two-dimensional vectors.

Embodiment 7

The process of any of the above embodiments, wherein monitoring a reactor pressure comprises measuring the reactor pressure at a second plurality of times; and sampling the measured pressures to generate the sampling values.

Embodiment 8

The process of Embodiment 7, wherein sampling the measured pressures comprises selecting a subset of the measured pressures, combining a plurality of measured pressures to form a sampling value, or a combination thereof.

Embodiment 9

The process of any of the above embodiments, wherein determining a residue value comprises: determining a mean vector based on the pattern window vectors; calculating a variance based on the pattern window vectors; and calculating the residue value based on the determined mean vector and the calculated variance.

Embodiment 10

The process of Embodiment 9, wherein the determined mean vector comprises a moving mean vector and the calculated variance comprises a moving variance.

Embodiment 11

The process of any of the above embodiments, wherein a plurality of residue values are calculated based on each pattern window vector, each residue value calculation being based on a different value of the memory parameter, $\mu$, for forming pattern window vectors.

Embodiment 12

The process of any of the above embodiments, wherein the threshold value is selected based on a standard deviation of the determined residue values.

Embodiment 13

The process of any of the above embodiments, wherein initiating the wash sequence comprises replacing at least a portion of a feedstock for the reactor with a wash solvent; and maintaining the wash solvent in the feedstock until at least about 3 reactor volumes of the wash solvent have passed through the reaction system, such as at least about 5 reactor volumes.

Embodiment 14

The process of Embodiment 13, wherein replacing at least a portion of the feedstock with a wash solvent comprises replacing at least about 30 vol % of the feedstock, or at least about 50 vol %, or at least about 70 vol %, or replacing the feedstock with the wash solvent.

Embodiment 15

The process of Embodiment 13 or 14, wherein the wash solvent comprises trimethyl benzene, N-methylpyrrolidone, light cycle oils, other refinery streams containing one- or two-ring aromatics, or a combination thereof.

Embodiment 16

The process of any of the above embodiments, wherein a plurality of pattern window vectors are formed based on each sampling value, at least two of the plurality of pattern window vectors having a different window size.

Embodiment 17

The process of any of the above embodiments, wherein the mean vector and the variance for a pattern window associated with a time are based on pattern window vectors within a sampling window, the sampling window having a second window size, the second window size being larger than the first window size.

Embodiment 18

The process of any of the above embodiments, wherein the corrective action or wash sequence is automatically initiated based on identifying the residue value greater than the threshold value.

Embodiment 19

The process of any of the above embodiments, wherein the reactor comprises a fixed bed reactor for hydroprocessing a feedstock.

Embodiment 20

The process of any of the above embodiments, wherein the reactor pressure is a pressure associated with a reactor in a reaction system.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A process for mitigating plugging in a reactor containing a fixed bed of catalyst, comprising:
monitoring a reactor pressure to obtain a plurality of sampling values at a plurality of times;
forming pattern window vectors having a first window size based on the sampling values, each pattern window vector being associated with a time from the plurality of times;
determining residue values for the pattern window vectors at the plurality of times based on a variance and a difference between the pattern window vector and a mean vector, the mean vector and the variance for a pattern window vector associated with a time being based on more than one portion of the pattern window vectors;
identifying a residue value greater than a threshold value; and
initiating a wash sequence for the catalyst bed based on the identified residue value.

2. The process of claim 1, wherein monitoring a reactor pressure comprises monitoring a pressure drop across a catalyst bed.

3. The process of claim 1, further comprising monitoring one or more additional pressures or temperatures, wherein the pattern window vectors comprise two-dimensional vectors.

4. The process of claim 1, wherein monitoring a reactor pressure comprises measuring the reactor pressure at a second plurality of times; and sampling the measured pressures to generate the sampling values.

5. The process of claim 4, wherein sampling the measured pressures comprises selecting a subset of the measured pressures, combining a plurality of measured pressures to form a sampling value, or a combination thereof.

6. The process of claim 1, wherein determining a residue value comprises:
determining a mean vector based on the pattern window vectors;
calculating a variance for the pattern window vectors; and
calculating the residue value based on the determined mean vector and the calculated variance.

7. The process of claim 6, wherein the determined mean vector comprises a moving mean vector and the calculated variance comprises a moving variance.

8. The process of claim 7, wherein a plurality of residue values are calculated based on each pattern window vector, each residue value calculation being based on a different value of the memory parameter, $\mu$, for forming pattern window vectors.

9. The process of claim 1, wherein the threshold value is selected based on a standard deviation of the determined residue values.

10. The process of claim 1, wherein initiating the wash sequence comprises replacing at least a portion of a feedstock for the reactor with a wash solvent; and maintaining the wash solvent in the feedstock until at least about 3 reactor volumes of the wash solvent have passed through the reaction system.

11. The process of claim 10, wherein replacing at least a portion of the feedstock with a wash solvent comprises replacing at least about 50 vol % of the feedstock with the wash solvent, the wash solvent comprising trimethyl benzene, N-methylpyrrolidone, light cycle oils, other refinery streams containing one- or two-ring aromatics, or a combination thereof.

12. The process of claim 1, wherein a plurality of pattern window vectors are formed based on each sampling value, at least two of the plurality of pattern window vectors having a different window size.

13. The process of claim 1, wherein the mean vector and the variance for a pattern window associated with a time are based on pattern window vectors within a sampling window, the sampling window having a second window size, the second window size being larger than the first window size.

14. The process of claim 1, wherein the wash sequence is automatically initiated based on identifying the residue value greater than the threshold value.

15. A process for mitigating plugging in a reactor containing a fixed bed of catalyst, comprising:
monitoring a reactor pressure to obtain a plurality of sampling values at a plurality of times;
forming pattern window vectors having a first window size based on the sampling values;
selecting a value for the memory parameter, p, where 1/p is greater than the first window size;
determining residue values for the pattern window vectors at the plurality of times based on the selected memory parameter value, a moving variance and a difference between the pattern window vector and a moving mean vector, the moving mean vector and the moving variance for a pattern vector associated with a time being based on more than one of the pattern window vectors;

identifying a residue value greater than a threshold value; and initiating a wash sequence for the catalyst bed based on the identified residue value.

* * * * *